United States Patent [19]
Bauer

[11] 3,880,227
[45] Apr. 29, 1975

[54] ARRANGEMENT FOR HEATING AND COOLING A DOUBLE-WALLED MOLD

[75] Inventor: Adolf Bauer, Olching, Germany

[73] Assignee: Thermovox GmbH, Munich, Germany

[22] Filed: June 8, 1973

[21] Appl. No.: 368,079

[30] Foreign Application Priority Data
June 13, 1972 Germany............................ 2228630

[52] U.S. Cl..................................... 165/27; 165/61
[51] Int. Cl............................................ F25b 29/00
[58] Field of Search .............. 165/2, 12, 61, 27, 22, 165/50

[56] References Cited
UNITED STATES PATENTS
3,259,175  7/1966  Kraus et al............................ 165/12
3,525,098  8/1970  Vox ........................................ 165/2

Primary Examiner—Charles Sukalo
Attorney, Agent, or Firm—Michael S. Striker

[57] ABSTRACT

An arrangement for heating and cooling a double-walled mold, expecially a mold for molding bodies of plastic material, in which the hollow space between the mold walls is connected by feed and return conduits to a pair of tanks respectively containing a heating and a cooling fluid so that such fluids may be selectively transmitted to the hollow space to cool, respectively heat the mold, and wherein pump means are provided in the return conduits to produce at the connection of the return conduits with the hollow space a suction pressure which is greater than the pressure at which the heating or the cooling fluid enters the hollow space.

12 Claims, 2 Drawing Figures

ARRANGEMENT FOR HEATING AND COOLING A DOUBLE-WALLED MOLD

BACKGROUND OF THE INVENTION

The present invention relates to an arrangement for heating and cooling double-walled molds for molding bodies of plastic material, especially rotary molds, in which the hollow space between the mold walls is connected by feed and return conduits to a pair of tanks which respectively contain a heating and a cooling fluid so that such fluids may be selectively transmitted to the hollow space for heating or cooling the mold walls. Pump means are provided in the return conduits which will produce at the connection of the return conduits with the hollow space a suction pressure which is greater than the pressure at which the heating and the cooling fluid enter the hollow space.

The walls of double-walled molds should be as thin as possible so that the mold may be quickly heated and quickly cooled again. On the other hand, these walls must properly withstand the heating or cooling liquid passed under pressure through the hollow space between the walls. These somehow contradictory requirements cause, especially with large molds, considerable difficulties. Furthermore, molds which are rotated during the molding operation should be as light as possible and have relatively small dimensions. A mold as mentioned above is already disclosed in the German Patent No. 1,296,33 in which in the return conduit from the mold a suction pump is provided having a pumping capacity which is preferably slightly greater than that of a pressure pump located in each feed conduit. In this way, the creation of an overpressure in the space between the two walls of a double-walled mold, with a specific flow resistance and a specific viscosity of the fluid used, is avoided so that also large molds may be constructed with relatively thin walls and thereby be properly and quickly, heated, respectively cooled. Thereby it is possible to circulate the cooling or heating fluid with high speed through the space between the mold walls by simultaneously pumping the fluid into and out of the aforementioned space so that the temperature drop of the fluid from the inlet to the outlet of the space will be small, whereby also very large molds may be maintained at an exact predetermined substantially constant temperature. This is important since especially in large molds the uniform heating thereof is essential for the quality of bodies of plastic material molded therein. While the arrangement disclosed in the aforementioned German patent will produce these advantageous results, this arrangement has the disadvantage that the heating as well as the cooling circuit requires two circulating pumps, or even three circulating pumps when in each of these circuits a heat exchanger is provided.

SUMMARY OF THE INVENTION

It is an object of the present invention to provide an arrangement for heating and cooling double-walled molds in which the necessary number of circulating pumps can be reduced as compared with such arrangements known in the art, while nevertheless maintaining the aavantages derivable from these known arrangements.

With these and other objects in view, which will become apparent as the description proceeds, the present invention relates to an arrangement for heating and cooling a double-walled mold, especially for molding bodies of plastic material, in which the double-walled mold defines between the walls thereof a space adapted to be flown through by a liquid heating or cooling medium and the arrangement mainly comprises a pair of closed pressure tanks respectively adapted to contain a liquid cooling and a liquid heating medium, a feed conduit connecting each of the tanks with the space of the mold for feeding liquid medium from the respective tank into the space, a return conduit connecting each of the tanks with the mold space for returning liquid medium from the space to the respective tank, and a single pump provided only in each of the return conduits for producing a suction pressure at the junction of the return conduit with the space which is slightly greater than the pressure at which the respective liquid medium enters the space through the feed conduit.

The pressure tanks may be arranged at an elevation higher than that of the mold so that the liquid in the tank will flow by gravity into the space between the mold walls, or the pressure tanks may be partly filled with a compressed gas so that the fluid from the tank will flow, under the pressure of the gas acting thereon in the tank, into the space between the mold walls, and of course it is also possible to arrange the gas pressurized tanks at an elevation higher than the molds so that the fluid medium will flow from the tanks under the influence of gravity and of the gas pressure acting thereon into the space between the double walls of the mold. Preferably, a heat exchanger is provided in each of the return conduits downstream of the pump provided therein for respectively heating or cooling the fluid passing through the return conduit, and in this arrangement also a single pump is sufficient to circulate the fluid also through the heat exchanger. According to a further development of the present invention, bypass means are provided for circulating the liquid medium by the pump through the respective tank and heat exchanger without feeding the liquid medium into the space between the walls of the mold. Such bypass means may comprise a conduit connecting the feed conduit of each tank with the return conduit of the respective tank upstream of the pump provided in the return conduit, or the bypass means may comprise an additional conduit connecting the return conduit of a tank upstream of said pump in the return turn conduit with the respective tank. Since the heat exchanger is located in the return conduit downstream of the pump therein, a substantially constant temperature of the heating and cooling medium will be obtained with the last-mentioned arrangement which will improve the heating, respectively the cooling the mold walls.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
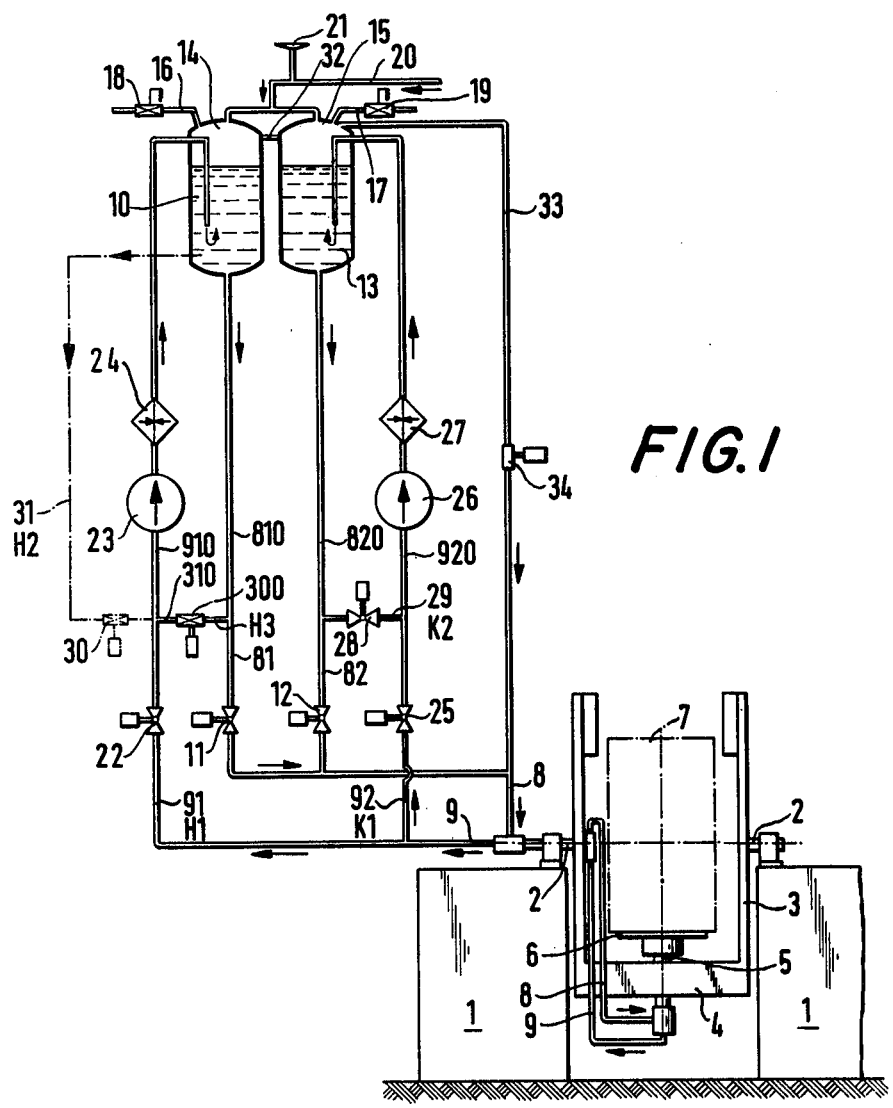
FIG. 1 schematically illustrates, partly in cross-section, a side view of the arrangement according to the present invention.
Figure 2:
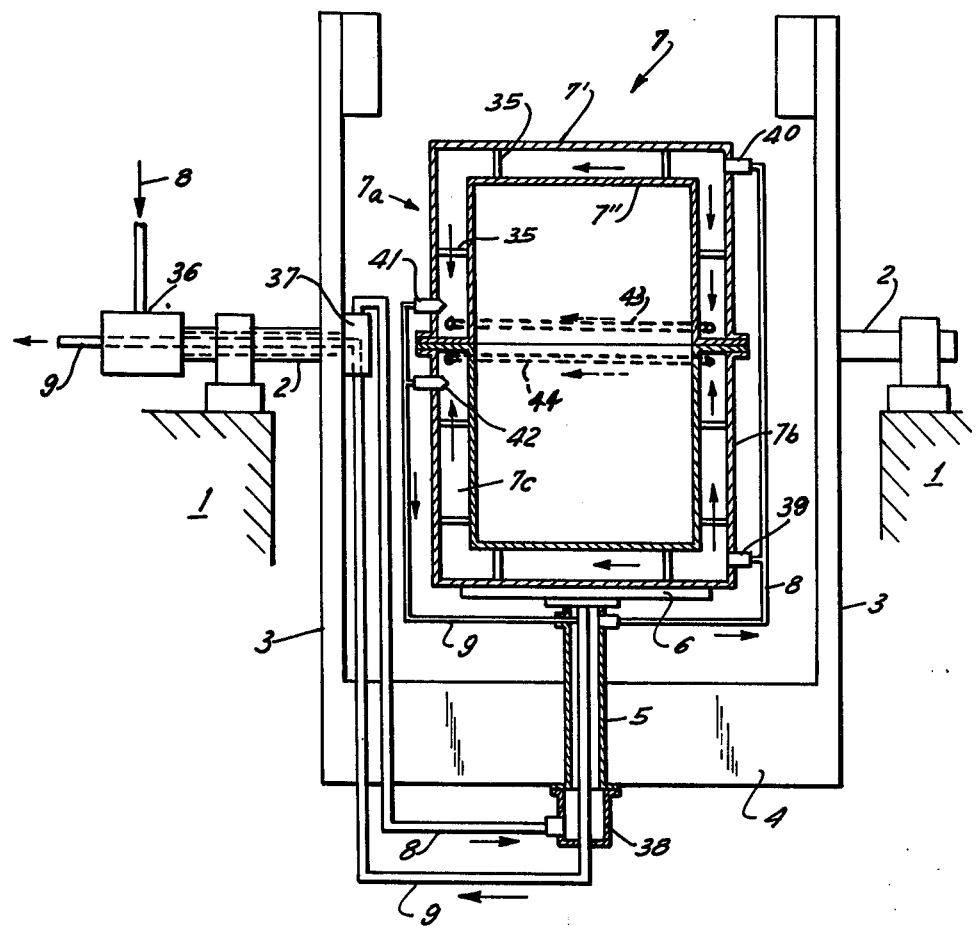
FIG. 2 is a schematic cross-sectional through the double-walled mold and the connection of the inlet and outlet conduits thereto.

Referring now to FIG. 1 of the drawing, it will be seen that the arrangement according to the present invention comprises a pair of spaced support means 1 on which bearings rotatably supporting the trunnions 2 of a U-shaped frame 3, 4 are mounted so that the frame 3, 4 may be turned about a horizontal axis. The transverse portion 4 of the U-shaped frame turnably supports an upright hollow shaft 5 which carries in the region of its upper end a mold holding plate 6. The mold 7, which is only schematically illustrated in FIG. 1, is a double-walled mold as shown in FIG. 2 and is secured in a known manner to the plate 6. A feed conduit 8 and a return conduit 9 communicate in a known manner through stuffing boxes or similar arrangements with the space defined by the double walls of the mold. As shown in FIG. 2 the mold 7 comprises an upper mold part 7a and a lower mold part 7b abutting against each other on flanges releasably connected to each other in a known manner not shown in the drawing. Each of the mold parts is formed by an outer wall 7' and an inner wall 7'' maintained spaced from each other by a plurality of spacer members 35 so as to define between the walls 7' and 7'' a space 7c through which a cooling or heating fluid is circulated to cool respectively heat the mold walls. The feed conduit 8 and the return conduit 9 pass through a stuffing box or fluid coupling 36 on the left trunion 2, as viewed in FIG. 2, permitting turning of the trunion with respect to the conduits, through the hollow trunion into a connecting box 37 and from there into a second stuffing box or fluid coupling 38 through the hollow shaft 5 turnably mounted in the transverse portion 4 of the U-shaped frame. From the upper end of shaft 5 the feed conduit 8 leads to two inlets 39 and 40 respectively communicating with the space 7c of the lower and upper mold part 7a and 7b to pass therethrough as indicated by the arrows to leave through the outlets 41 and 42 connected to the return conduit 9. The portion of the conduit 8 between the inlets 39 and 40 and the portion of the conduit 9 between the outlets 41 and 42 may be flexible or provided with couplings to permit separation of the upper from the lower mold part, when required. The fluid will also circulate through conduit 43 and 44 leading along the flanges which connect the upper with the lower mold part.

The means for rotating the U-shaped frame 3, 4 with the trunions 2 about the axis of the latter and the means for rotating the shaft 5 with the mold 7 connector thereto, form no part of the present invention and are, therefore not shown in the drawing. Likewise not shown are the means for feeding plastic material into the mold cavity.

The feed conduit 8 is branched upstream of the mold into two branch feed conduits 81 and 82 which respectively communicate with the lower ends of two tanks 10 and 13. The tank 10 contains a liquid heating medium, for instance heated oil, whereas the tank 13 contains a liquid cooling medium, for instance cold oil. A valve 11, preferably a solenoid-operated valve, is located in the branch feed conduit 81 for permitting or preventing flow of heating fluid therethrough and a corresponding solenoid-valve 12 is located in the branch feed conduit 82. As shown in the drawing each of the tanks is only partly filled with the liquid medium and the space above the liquid medium in each tank is filled with a pressurized gas, for instance nitrogen, for maintaining the hot and the cold oil in the respective tank under pressure so that the liquid medium will flow from the tank through the feed conduit into the space between the double walls of the mold under the influence of the pressure of the gas acting in the tanks on the fluid therein, thus making provision of separate pumps for feeding the fluid from the respective tanks into the mold space unnecessary. If the tanks 11 and 13 are arranged at an elevation higher than the mold 7, providing a gas pressure on the liquid in the tank will become unnecessary, since in this case the fluid from the tank will flow into the space defined by the double-walled mold by gravity. In either case, the tank will act as a pressure tank, the content of which, that is the liquid heating or cooling medium will flow solely under the influence of gravity, respectively the gas pressure, into the space defined by the double walls of the mold without requiring a pump in each of the feed conduits.

If the upper space in each tank is filled with a pressurized gas as described above, then a conduit 16, respectively 17 communicate with the gas space of each tank and in each of the conduits a safety valve 18, respectively 19 is provided which will open when the gas pressure in the tank surpasses a predetermined maximum pressure. A pressure gas feed conduit 20 leads through a safety overpressure valve 21 to the upper end of each of the two tanks.

The return conduit 9 is likewise divided into two branch return conduits 91 and 92. The branch return conduit 91 leads over a solenoid valve 22, a pump 23 and a heat exchanger 24, constructed to supply additional heat to the fluid medium passing through the return branch conduit 91, through the upper gas space 14 in the tank 10 into the hot liquid medium therein. In a similar manner the branch return conduit 92 leads over a solenoid valve 25, a suction pump 26 and a heat exchanger 27, constructed to cool the fluid medium passing therethrough, through the gas space 15 in the tank 13 and ends in the cool fluid medium contained in tank 13.

The arrangement includes further bypass means for circulating the liquid medium by the pump in the respective return conduit through the heat exchanger therein and the respective tank without feeding the liquid medium in the space defined by the double wall of the mold 7. The bypass means for the tank 13 may comprise a conduit 29 connected at one end to the branch feed conduit 82 between the tank 13 and the valve 12 in this feed conduit, and at the other end connected to the branch return conduit 92 between the valve 25 and the pump 26 in this return conduit. A solenoid valve 28 is located in the conduit 29 for permitting, respectively preventing flow of fluid passing therethrough. The connecting conduit 29 forms therefore with the portion 820 of the branch feed conduit 82 and the portion 920 of the branch return conduit 92, with the tank 30, the pump 26 and the heat exchanger 27, a secondary cold oil circuit K2 to the main cold oil circuit K1 which comprises the tank 13, the conduit portions 820, 82, the valve 12, the conduit 8, the mold space 7, the return conduit portions 9, 92, 920, the valve 25, the pump 26 and the heat exchanger 27.

Similar bypass means may also be provided in the conduits of the tank 10 and this bypass means may comprise a connecting conduit 310 connected to the branch feed conduit 81 between the tank 10 and the valve 11 at one end and at the other end connected to the branch return conduit 91 between the valve 22 and the suction pump 23. A solenoid valve 300 is again located in the connecting conduit 310 to permit, respectively prevent passage of fluid therethrough. In this way, the portion 810 of the branch return conduit 82 forms with the connecting conduit 310 and the solenoid valve 300 located therein and the portion 910 of the return branch conduit 91, the suction pump 23, the heat exchanger 24, and the tank 10, an auxiliary hot oil circuit H3 to the main hot oil circuit H1 which comprises the conduit portion 810, 81, the valve 11, the conduit 8, the mold 7, the conduit portions 9, 91 and 910 including the valve 22, the suction pump 23, the heat exchanger 24, and the tank 10. On the other hand, the bypass conduit for the tank 10 may comprise a separate conduit 31, indicated in dash-dot lines in the drawing, which communicates at one end with the bottom portion of the tank 10 and at the other end with the branch return conduit 91 between the valve 22 and the suction pump 23 located therein. A solenoid valve 30 is again provided in the conduit 31 for permitting, respectively preventing flow of fluid therethrough. In this way an auxiliary hot oil circuit H2 is provided in addition to the main hot oil circuit H1. Evidently, a similar auxiliary cold oil circuit may also be provided for the tank 13.

The two tanks 10 and 13 are connected at the upper ends thereof by a pressure equalization conduit 32 which will assure that equal pressures will be maintained in both tanks.

The gas-filled upper space 15 of the tank 13 is further connected by a conduit 33 with the feed conduit 8, so that by opening a valve 34 in conduit 33, gas under pressure will be fed into the space defined by the two walls of the double-walled mold to displace any liquid medium therein.

All solenoid valves of the arrangements as well as the other elements thereof may be operated by hand. In order to continuously operate the mold for molding a succession of bodies therein it is, however, advantageous to operate all elements of the arrangement and especially the solenoid valves 11, 12, 22, 25, 28, 30, 34 and 300 in proper sequence from known programming means.

The above-desired arrangement will operate as follows:

Before starting operation, the space between the walls of the double-walled mold 7, the various conduits and the tanks 10 and 13 are filled with oil, and if pressurized gas is used for causing flow of the oil from the tanks into the mold space, such pressurized gas is fed through the pressure gas conduit 20 into the tanks.

Thereafter, the pumps 23 and 26 are operated and the solenoid valves 30, respectively 300, and 28 are opened. The oil is thereby circulated through the auxiliary hot oil circuit H2, respectively H3, and through the auxiliary cold oil circuit K2. Since the thus circulated oil passes through the heat exchanger 24 in which heat is added to the circulating oil, respectively to the heat exchanger 27 in which the oil is cooled, hot and cold oil of desired temperature will be formed, whereby non-illustrated control devices controlling the heat exchangers will assure that the desired temperatures in the two circuits will be reached and maintained.

When the desired temperatures for the oil in the auxiliary hot and cold oil circuits are reached, the various valves are successively operated to cause flow of the oil through the main hot and cold oil circuits H1 and K1 to heat and cool the mold 7. The heating and cooling of the mold is preferably supported by rotating the same about the horizontal and vertical axes by means not shown in the drawing.

More specifically, the various valves are to be operated in the following manner:

During start of the heating period, the valve 30, respectively 300 is maintained open. The valve 22 is maintained closed. The valve 11 is opened, the valves 28 and 12 are closed, the valve 25 is opened and the pumps 23 and 26 are in operation. The oil, heated while being circulated through the auxiliary hot oil circuit, will thereby start to flow from the hot oil tank 10 through the open valve 11 into the space between the walls of the double-walled mold, while cold oil from the space will start to flow through the opened valve 24, through the pump 26, the heat exchanger 27 into the tank 13.

During the following period, in which the mold is continuously heated, the valve 30 or 300 will be closed, the valve 22 opened, while the valve 11 stays open. Valve 28 is opened, valve 12 stays closed, valve 25 is closed, and the pumps 23 and 26 will be maintained in operation. Hot oil will therefore exclusively flow from the hot oil tank 10 through the opened valve 11 into the mold space and flow out from the latter through the opened valve 22 and the heat exchanger 24 back into the hot oil tank. The cold oil will flow from the tank 13 through the opened valve 28, and, since the valve 25 is closed, the cold oil will be circulated through the auxiliary cold oil circuit K2 by the pump 26 through the heat exchanger 27 and back into the cold oil tank 13.

During changeover from the heating to the cooling period, the valve 30 or 300 is maintained closed, the valve 22 is maintained open, valve 11 and the valve 28 will be closed, valve 12 will be opened, the valve 25 stays closed, the pump 23 is maintained in operation and the pump 26 may be stopped. Since the valve 11 is closed, further flow of hot oil from the hot oil tank 10 into the mold space is interrupted, and cold oil from the cold oil tank 13 will flow through the open valve 12 into the mold space, while hot oil from the mold space will return through the opened valve 22, the pump 23, and the heat exchanger 24 into the hot oil tank 10.

During the following cooling period, the valve 30 or 300 is opened, the valve 22 will be closed, the valves 11 and 28 stay closed, valve 12 stays open, valve 25 will be opened, and the pumps 23 and 26 are operated. Flow of hot oil from the hot oil tank 10 into the space between the mold walls will thereby be interrupted, and the hot oil from the tank 10 will be circulated through the auxiliary hot oil circuit H3. At the same time, since the valve 12 is open, cold oil from the cold oil tank 13 will flow into the space between the mold walls and flow back from the same through the opened valve 25, the pump 26 and the heat exchanger 27 into the cold oil tank 13. The mold walls will thereby be cooled, while the hot oil circulated through the auxiliary hot oil circuit will be brought to the desired temperature and maintained at the latter.

At the end of the cooling period, the molded article is removed from the mold 7 and a new cycle is started.

If it is desired to remove the oil from the space between the mold walls, the valve 11, 12, 22 and 28 are closed, and the valves 34 and 25 are opened, so that compressed gas from the tank 13 will pass into the space between the mold walls to displace the oil therefrom which is pushed back by the gas into the tank 13. Such displacement of the oil from the space between the mold walls may be desirable during an exchange of one mold for another.

It will be understood that each of the elements described above, or two or more together, may also find a useful application in other types of an arrangement for heating and cooling double-walled molds differing from the types described above.

While the invention has been illustrated and described as embodied in an arrangement for heating and cooling of a double-walled mold, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An arrangement for heating and cooling a double-walled mold having thin walls, especially for molding bodies of plastic material, said double-walled mold defining between the walls thereof a space adapted to be flown through by a liquid heating or cooling medium, said arrangement comprising a pair of closed pressure tanks located at an elevation higher than that of said mold and respectively adapted to contain a liquid cooling and a liquid heating medium; a feed conduit connecting each of said tanks with said space of said mold for feeding liquid medium by gravity from the respective tank into said space; a return conduit connecting each of said tanks with said space of said mold for returning liquid medium from said space into the respective tank; valve means in each of said conduits for permitting and preventing passage of liquid medium therethrough; a single suction pump provided only in each of said return conduits for producing a suction pressure at the junction of said return conduit with said space which is slightly greater than the pressure at which the respective liquid medium enters said space through said feed conduit; and heat exchanger means in each of said return conduits, downstream of the pump, for heating, respectively cooling the fluid medium passing therethrough.

2. An arrangement as defined in claim 1, and including bypass means for circulating the liquid medium through the respective tank without feeding the liquid medium into said space.

3. An arrangement as defined in claim 2, wherein said bypass means comprises a conduit connecting the feed conduit of each tank with the return conduit of the respective tank upstream of the pump therein and a valve in each connecting conduit.

4. An arrangement as defined in claim 2, wherein said bypass means comprises a additional conduit connecting the return conduit of a tank upstream of said pump with the respective tank, and valve means in said additional conduit.

5. An arrangement as defined in claim 1, and including means mounting the mold turnable rotatably about two axes which are normal to each other.

6. An arrangement for heating and cooling a double-walled mold having thin walls, especially for molding bodies of plastic material, said double-walled mold defining between the walls thereof a space adapted to be flown through by a liquid heating or cooling medium, said arrangement comprising a pair of closed pressure tanks respectively adapted to contain a liquid cooling and a liquid heating medium and filled with compressed gas above the liquid medium therein; a feed conduit connecting each of said tanks with said space of said mold for feeding liquid medium by the pressure of the compressed gas from the respective tank into said space; a return conduit connecting each of said tanks with said space of said mold for returning liquid medium from said space into the respective tank; valve means in each of said conduits for permitting and preventing passage of liquid medium therethrough; a single suction pump provided only in each of said return conduits for producing a suction pressure at the junction of said return conduit with said space which is slightly greater than the pressure at which the respectively liquid medium enters said space through said feed conduit; and heat exchanger means in each of said return conduits, downstream of the pump, for heating, respectively cooling the fluid medium passing therethrough.

7. An arrangement as defined in claim 6, and including a further conduit connecting the part of one of the tanks which is filled with compressed gas with a feed conduit, and valve means in said further conduit.

8. An arrangement as defined in claim 6, and including means providing communication between the gas-filled parts of the two tanks. permitting and preventing passage of liquid medium therethrough; a single suction pump provided only in each of said return conduits for producing a suction pressure at the junction of said return conduit with said space which is slightly greater than the pressure at which the respective liquid medium enters said space through said feed conduit; and heat exchanger means in each of said return conduits, downstream of the pump, for heating, respectively cooling the fluid medium passing therethrough.

9. An arrangement as defined in claim 6, and including bypass means for circulating the liquid medium through the respective tank without feeding the liquid medium into said space.

10. An arrangement as defined in claim 9, wherein said bypass means comprises a conduit connecting the feed conduit of each tank with the return conduit of the respective tank upstream of the pump therein and a valve in each connecting conduit.

11. An arrangement as defined in claim 9, wherein said bypass means comprises an additional conduit connecting the return conduit of a tank upstream of said tank with the respective tank, and valve means in said additional conduit.

12. An arrangement as defined in claim 6 and including means mounting the mold rotatably about two axes which are normal to each other.

* * * * *